United States Patent
Wilk et al.

(10) Patent No.: US 11,365,781 B2
(45) Date of Patent: Jun. 21, 2022

(54) METHOD OF MANUFACTURING A MONOTUBE SHOCK ABSORBER

(71) Applicant: DRiV Automotive Inc., Lake Forest, IL (US)

(72) Inventors: Tomasz Michal Wilk, Lubliniec (PL); Krzysztof Mariusz Rojczyk, Rybnik (PL); Koen Joseph R. Spaas, Borgloon (BE)

(73) Assignee: DRiV Automotive Inc., Lake Forest, IL (US)

( * ) Notice: Subject to any disclaimer, the term of this patent is extended or adjusted under 35 U.S.C. 154(b) by 164 days.

(21) Appl. No.: 16/599,455

(22) Filed: Oct. 11, 2019

(65) Prior Publication Data

US 2021/0108695 A1  Apr. 15, 2021

(51) Int. Cl.
  *F16F 9/04* (2006.01)
  *F16F 9/32* (2006.01)
  *F16F 9/36* (2006.01)

(52) U.S. Cl.
  CPC .......... *F16F 9/0454* (2013.01); *F16F 9/3242* (2013.01); *F16F 9/3271* (2013.01); *F16F 9/36* (2013.01)

(58) Field of Classification Search
  CPC .......... F16F 9/362; F16F 9/061; F16F 9/3214; F16F 9/36; F16F 9/0454; F16F 9/3242; F16F 9/3271
  See application file for complete search history.

(56) References Cited

U.S. PATENT DOCUMENTS

| | | | |
|---|---|---|---|
| 3,804,217 A | | 4/1974 | Keijzer et al. |
| 4,480,730 A | * | 11/1984 | Koller ............... F16F 9/364 188/315 |
| 5,531,299 A | * | 7/1996 | Bataille ............... F16F 9/363 188/322.17 |
| 6,209,691 B1 | | 4/2001 | Fehring et al. |
| 6,640,943 B1 | | 11/2003 | Daws et al. |
| 8,127,902 B2 | * | 3/2012 | Pasino ................ G06T 17/20 188/322.17 |
| 9,995,361 B2 | * | 6/2018 | Takeuchi ............. F16F 9/36 |

(Continued)

FOREIGN PATENT DOCUMENTS

| | | |
|---|---|---|
| DE | 4432305 | 3/1996 |
| DE | 10216323 | 3/2003 |

(Continued)

*Primary Examiner* — Pamela Rodriguez
(74) *Attorney, Agent, or Firm* — Burris Law, PLLC

(57) ABSTRACT

A method of manufacturing a shock absorber includes inserting a floating piston into a tube, disposing oil into the tube, and inserting a piston-rod assembly into the tube. The piston-rod assembly has a piston coupled to a rod. The method includes inserting a rod guide assembly into the tube. The rod guide assembly includes a sintered metal rod guide having a seat and a seal disposed in the seat. The rod extends through the seal. The method also includes deforming a wall of the tube into engagement with the sintered metal rod guide to provide a piston-cylinder assembly and inhibit axial movement of the rod guide assembly relative to the tube. The method further includes pressurizing the piston-cylinder assembly and forming a flange portion of the tube over an upper surface of the sintered metal rod guide.

20 Claims, 7 Drawing Sheets

(56) References Cited

U.S. PATENT DOCUMENTS

| | | |
|---|---|---|
| 10,400,845 B2 * | 9/2019 | Thein .................... F16F 9/362 |
| 2001/0023638 A1 | 9/2001 | Yamaguchi et al. |
| 2006/0185952 A1 | 8/2006 | Kojima |
| 2006/0231361 A1 | 10/2006 | Kojima |
| 2008/0179149 A1 | 7/2008 | Strong |
| 2009/0152779 A1 * | 6/2009 | Imoto ................ F16J 15/3232 |
| | | 267/129 |
| 2013/0075189 A1 | 3/2013 | Sekikawa et al. |

FOREIGN PATENT DOCUMENTS

| | | |
|---|---|---|
| DE | 102005009151 | 9/2006 |
| DE | 102012211521 | 1/2014 |
| DE | 102013204745 | 1/2014 |
| EP | 0658701 | 6/1995 |
| EP | 1302692 | 4/2003 |
| EP | 1956262 | 8/2008 |
| EP | 2647890 | 10/2013 |
| FR | 2709797 | 3/1995 |
| FR | 2739668 | 4/1997 |
| GB | 2296538 | 7/1996 |
| WO | 199001679 | 1/1999 |

* cited by examiner

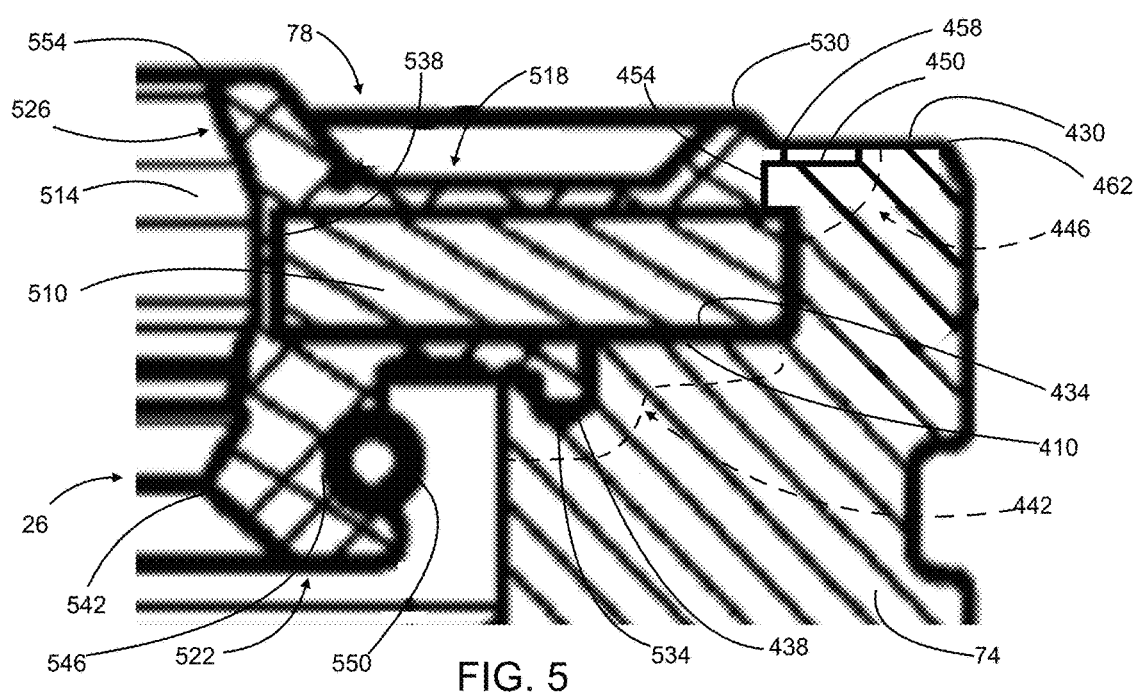
FIG. 5
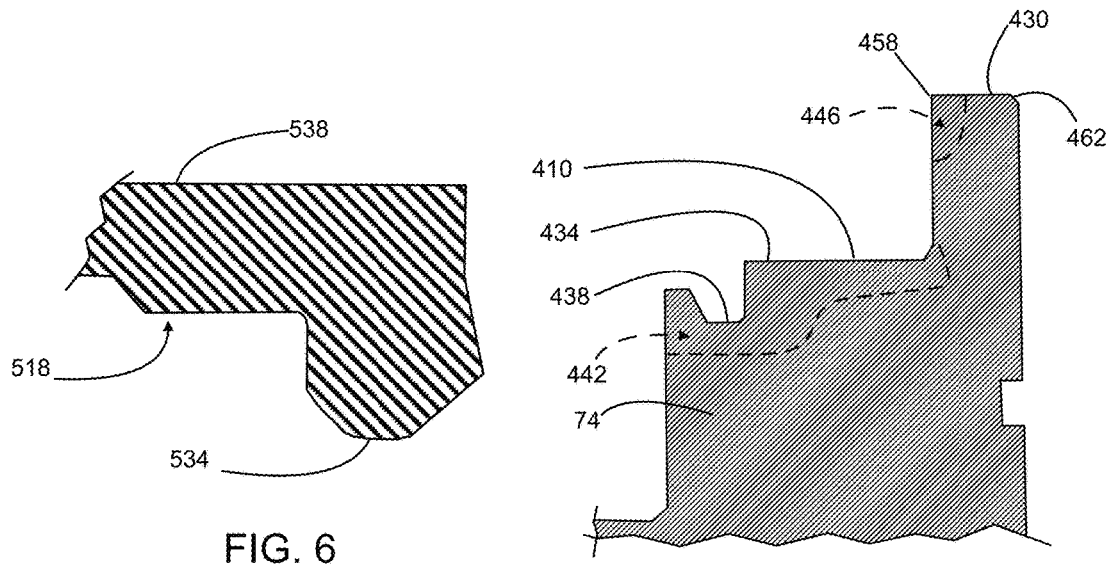
FIG. 6
FIG. 7

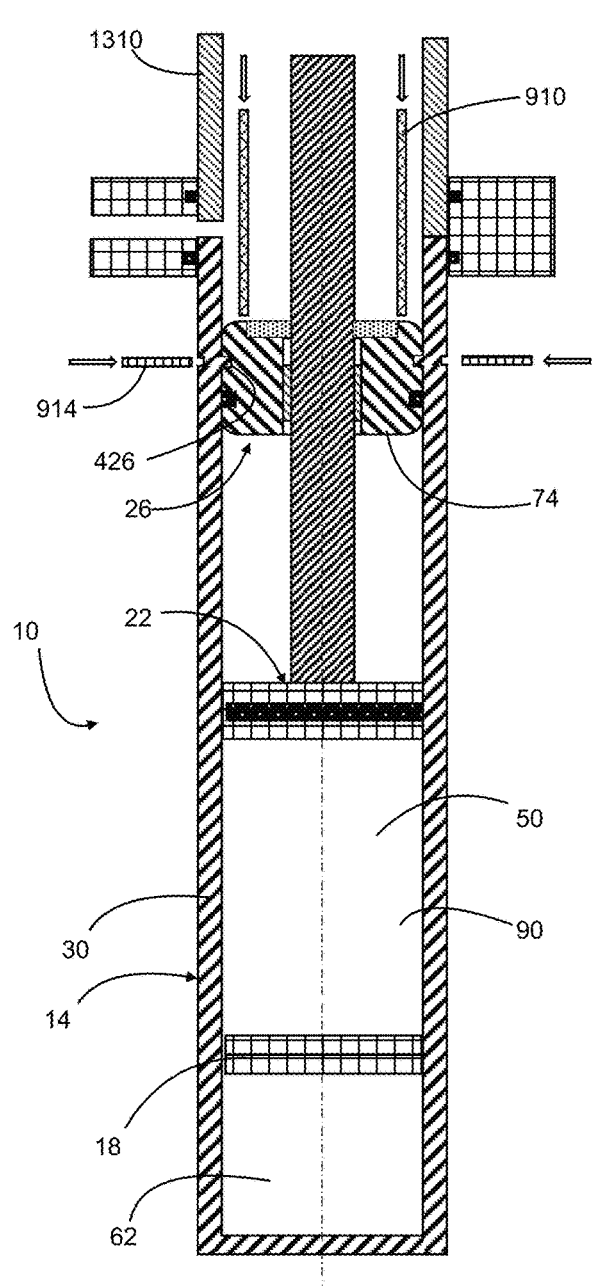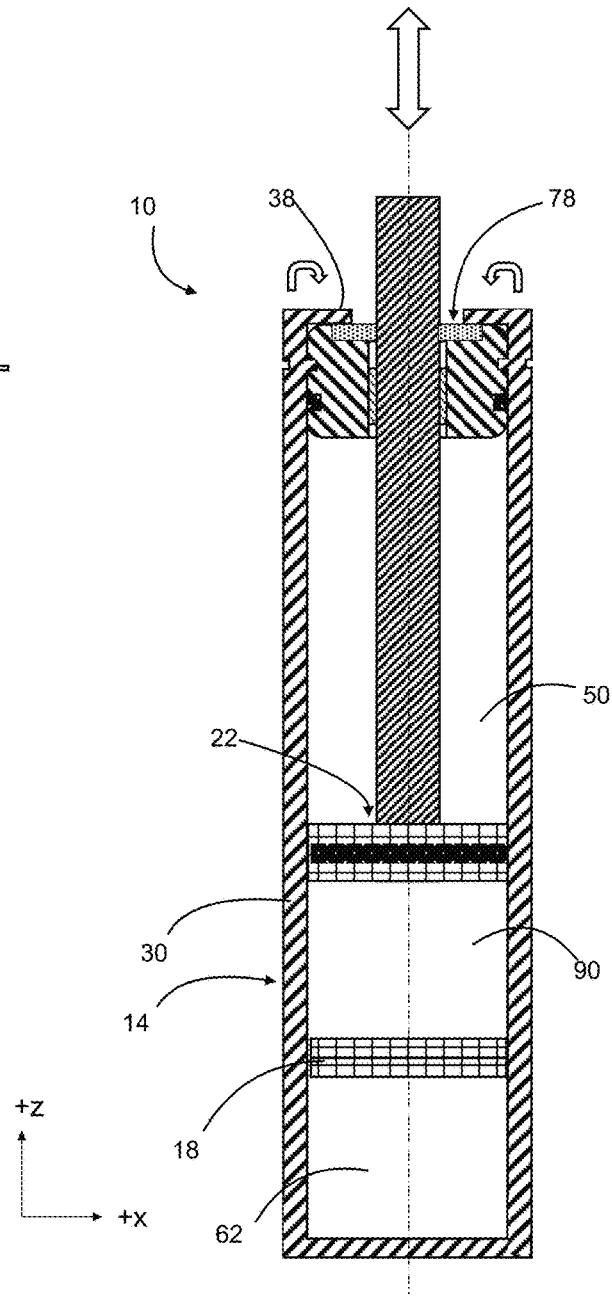
FIG. 14
FIG. 15

METHOD OF MANUFACTURING A MONOTUBE SHOCK ABSORBER

FIELD

The present disclosure relates to shock absorbers and particularly to methods of manufacturing monotube shock absorbers.

BACKGROUND

The statements in this section merely provide background information related to the present disclosure and may not constitute prior art.

Shock absorbers for vehicles such as motorcycles, automobiles and trucks, among others, typically have a piston-cylinder assembly with a tube that forms a cylinder containing oil and/or gas and a piston disposed in the cylinder. The piston is connected to a rod that extends from the tube. The rod passes through a rod guide that is positioned within the tube and guides movement of the rod along its central axis.

It can be difficult to adequately seal the oil and/or gas within the cylinder while also allowing the rod to move axially. Furthermore, the rod guide is typically formed of solid aluminum and can be costly to produce and time consuming to manufacture and install.

The rod guide assembly, shock absorber, and methods of the present disclosure addresses these issues, among others, of manufacturing shock absorbers.

SUMMARY

This section provides a general summary of the disclosure and is not a comprehensive disclosure of its full scope or all of its features.

In one form of the present disclosure, a method of manufacturing a shock absorber includes inserting a floating piston into a tube, disposing oil into the tube, and inserting a piston-rod assembly into the tube. The piston-rod assembly has a piston coupled to a rod. The method includes inserting a rod guide assembly into the tube. The rod guide assembly includes a sintered metal rod guide having a seat and a seal disposed in the seat. The rod extends through the seal. The method also includes deforming a wall of the tube into engagement with the sintered metal rod guide to provide a piston-cylinder assembly and inhibit axial movement of the rod guide assembly relative to the tube. The method further includes pressurizing the piston-cylinder assembly and forming a flange portion of the tube over an upper surface of the sintered metal rod guide. According to a variety of alternative configurations: the method further includes staking the sintered metal rod guide to secure the seal to the sintered metal rod guide; the step of staking the sintered metal rod guide is performed before inserting the rod guide assembly into the tube; the tube includes a bottom end portion having an opening and the step of pressurizing the piston-cylinder assembly includes applying pressure through the opening in the bottom end portion of the tube; the method further includes closing the opening in the bottom end of the tube to form a pressurized gas reservoir defined by the floating piston and the tube; the step of staking the sintered metal rod guide is performed after deforming the wall of the tube into the recess defined by the sintered metal rod guide; the step of pressurizing the piston-cylinder assembly includes applying a pressurized gas to a top end portion of the tube; the step of forming the flange portion of the tube over an upper surface of the sintered metal rod guide is performed after pressurizing the piston-cylinder assembly; the method further includes sintering metal to form the sintered metal rod guide, wherein the sintered metal rod guide has a first region that has a first density and a second region that has a second density that is less than the first density, wherein the seat is in the first region and the staking is performed on the second region; the tube includes a closed bottom end portion and the method further includes moving the floating piston within the tube toward a bottom end portion of the tube to form a pressurized gas reservoir below the floating piston; the step of deforming the wall of the tube into the recess defined by the sintered metal rod guide includes crimping the wall of the tube; the step of forming the flange portion of the tube over the upper surface of the sintered metal rod guide includes rolling the flange portion over the upper surface of the sintered metal rod guide so that the flange portion contacts the seal.

In another form of the present disclosure, a method for assembling a shock absorber includes inserting a floating piston into a tube, disposing oil into the tube on top of the floating piston, and inserting a piston-rod assembly having a piston and a rod into the tube to form an oil reservoir between the floating piston and the piston of the piston-rod assembly. The method further includes inserting a rod guide assembly into the tube. The rod guide assembly includes a sintered metal rod guide and a seal. The rod extends through the seal. The method additionally includes crimping a wall of the tube into engagement with the sintered metal rod guide to form a piston-cylinder assembly to inhibit axial movement of the sintered metal rod guide relative to the tube, pressurizing the piston-cylinder assembly, and rolling a flange portion of the tube over an upper surface of the sintered metal rod guide after pressurizing the piston-cylinder assembly. According to a variety of alternative configurations: the step of pressurizing the piston-cylinder assembly includes applying pressure through a bottom end portion of the tube; the method further includes staking the sintered metal rod guide to secure the seal to the sintered metal rod guide; the step of staking the sintered metal rod guide is performed before pressurizing the piston-cylinder assembly; the sintered metal rod guide defines a groove and the seal includes a static seal portion and a dynamic seal portion, the static seal portion including a lip disposed in the groove, the dynamic seal portion contacting the rod.

In still another form of the present disclosure, a method for assembling a shock absorber includes inserting a floating piston into a tube to form a gas reservoir between the floating piston and a closed bottom end portion of the tube, pouring oil into the tube onto the floating piston, and inserting a piston-rod assembly having a piston and a rod into the tube to form an oil reservoir between the floating piston and the piston of the piston-rod assembly. The method further includes inserting a rod guide assembly into the tube. The rod guide assembly includes a sintered metal rod guide and a seal. The rod extends through the seal. The method additionally includes crimping a wall of the tube into a recess defined by the sintered metal rod guide to form a piston-cylinder assembly, staking the sintered metal rod guide to secure the seal to the sintered metal rod guide, pressurizing the piston-cylinder assembly, and rolling a flange portion of the tube over an upper surface of the sintered metal rod guide after pressurizing the piston-cylinder assembly. According to a variety of alternative configurations: the step of pressurizing the piston-cylinder assembly includes applying pressure through a top end of the tube; the sintered metal rod guide includes a groove and the seal includes a static seal portion and a dynamic seal portion, the static seal portion including a lower lip disposed in the groove and an upper portion in contact with the flange.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
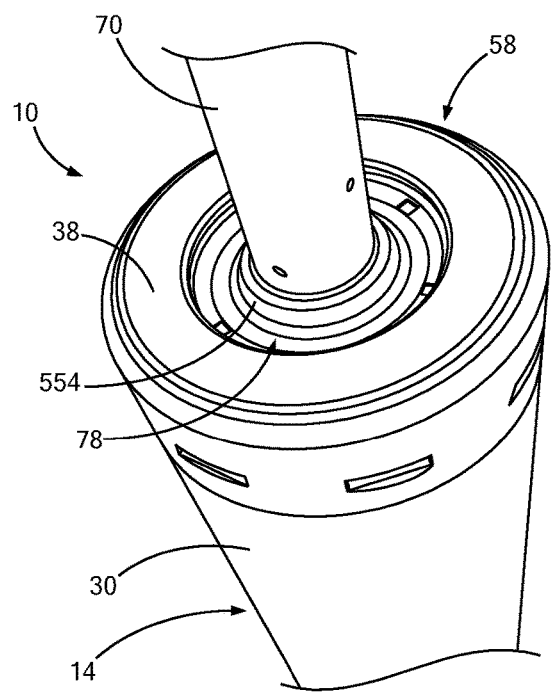
FIG. 1 is a perspective view of a portion of a monotube shock absorber according to the teachings of the present disclosure.
Figure 2:
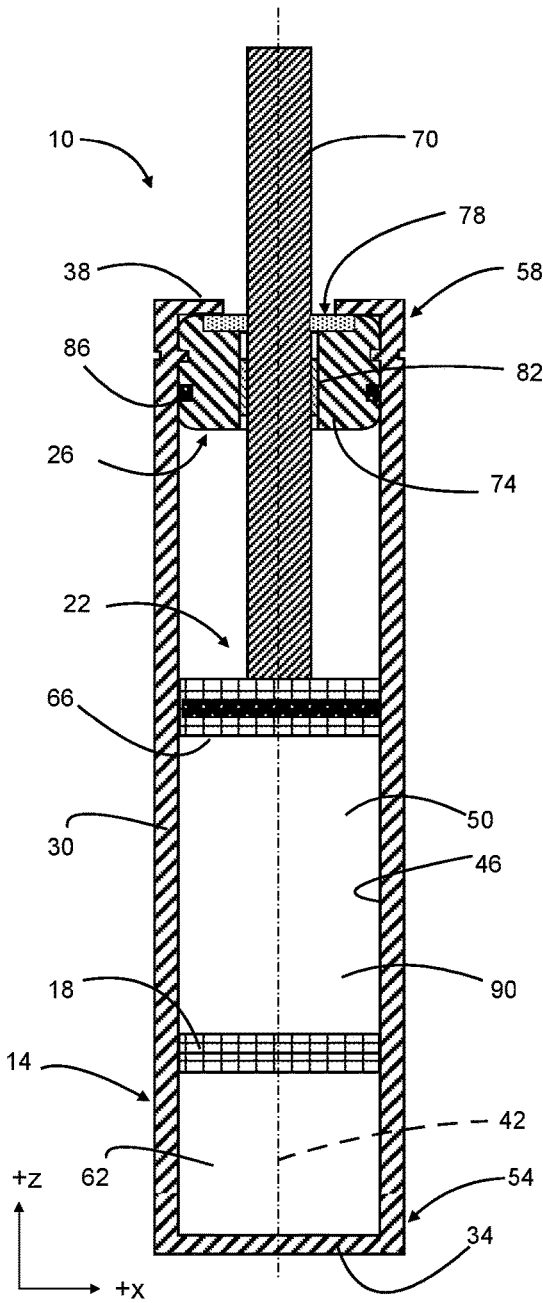
FIG. 2 is a cross-sectional view of the monotube shock absorber of FIG. 1, illustrating a rod guide assembly according to the teachings of the present disclosure.
Figure 8:
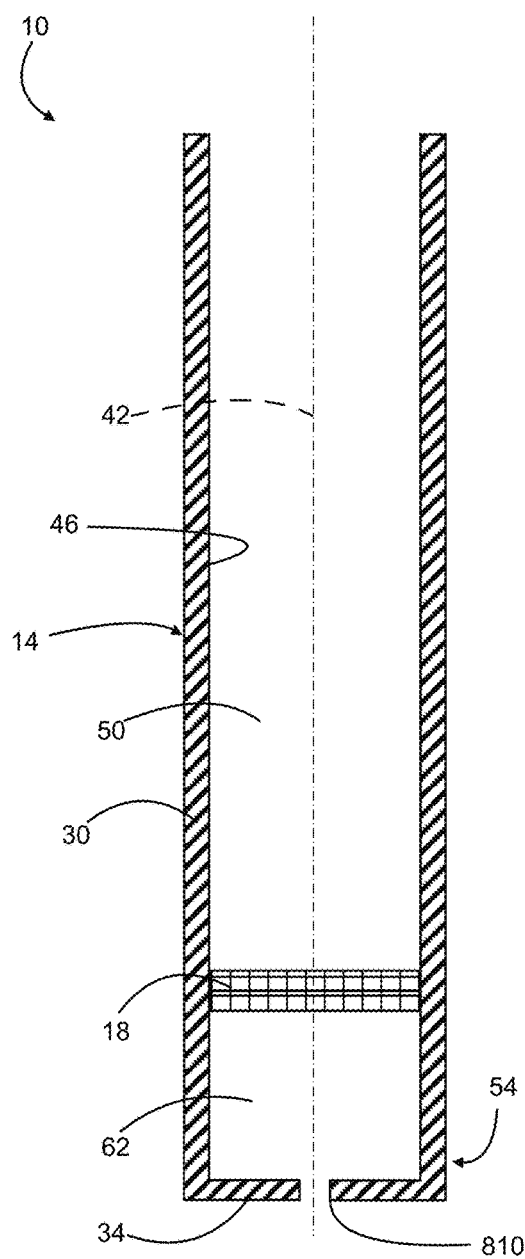
Figure 9:
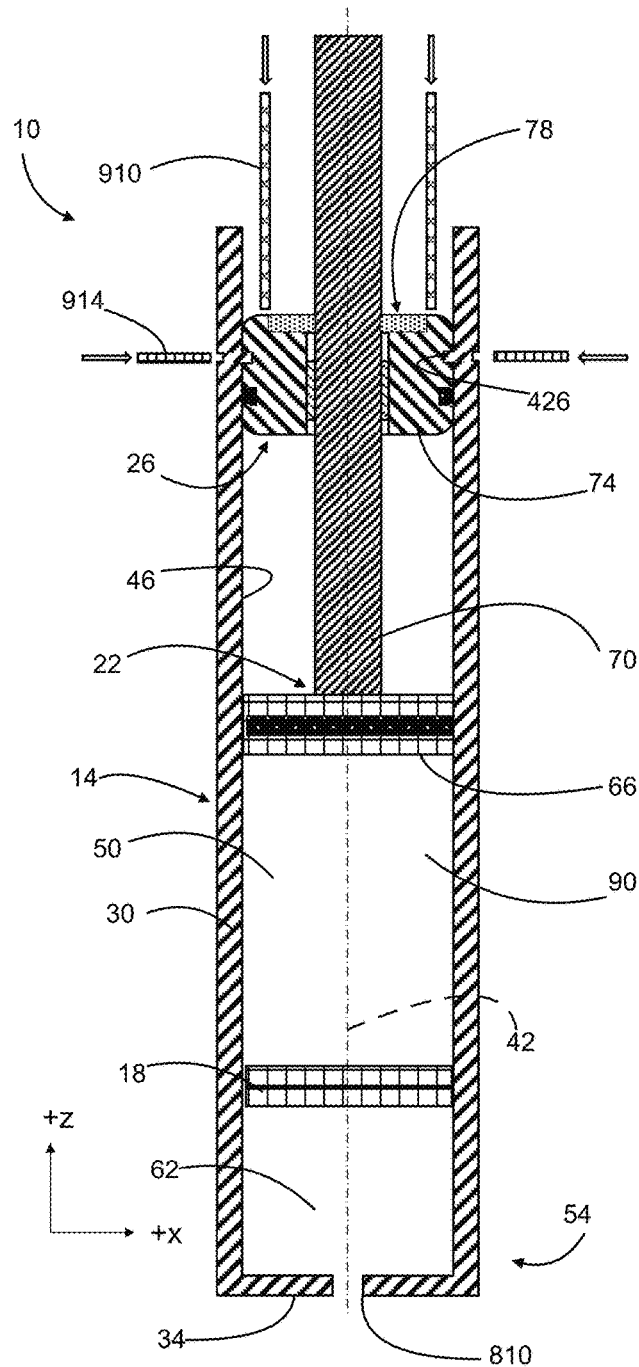
Figure 10:
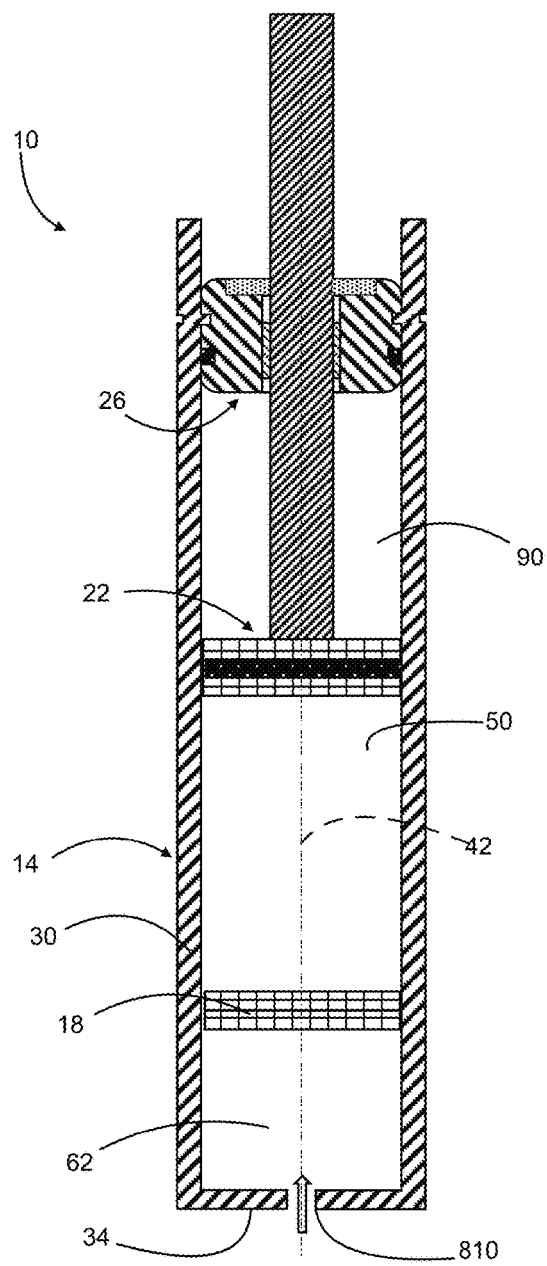
Figure 11:
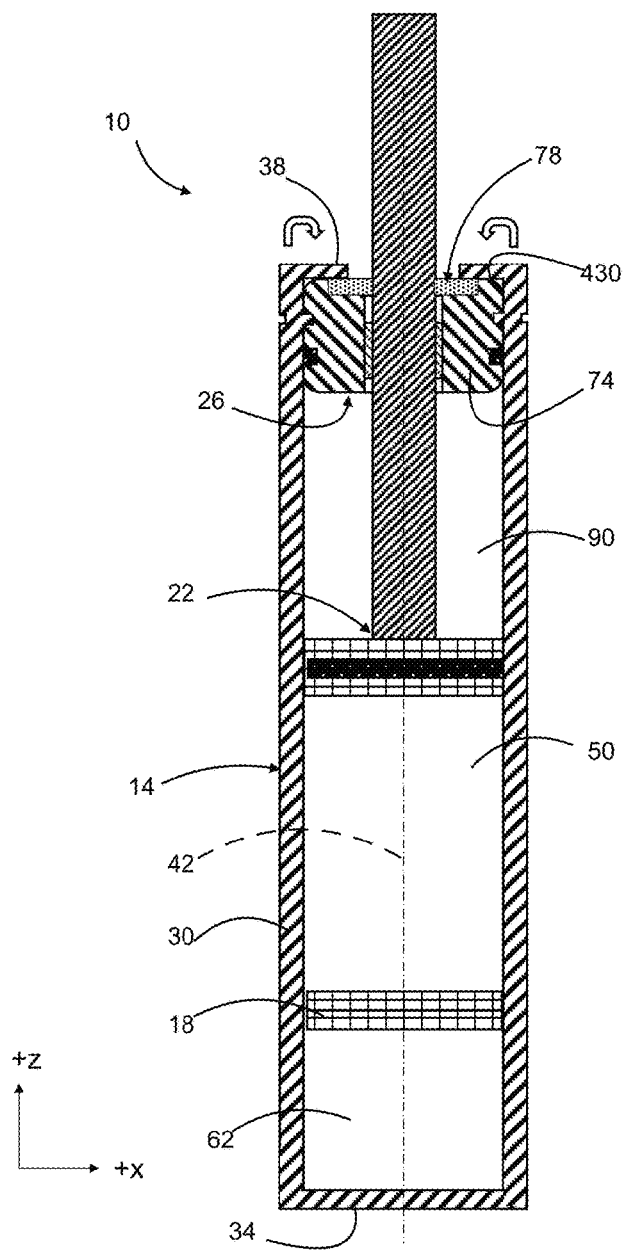
Figure 12:
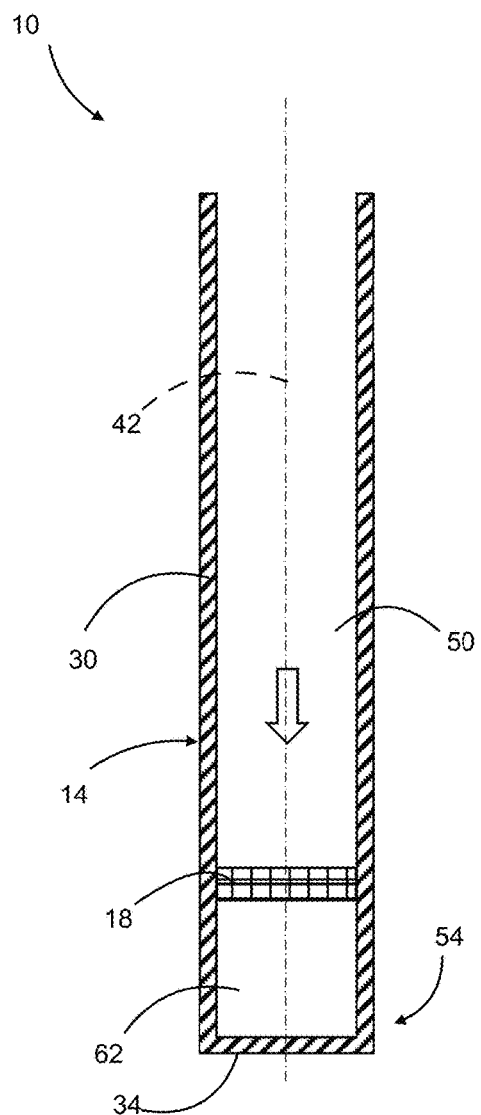
Figure 13:
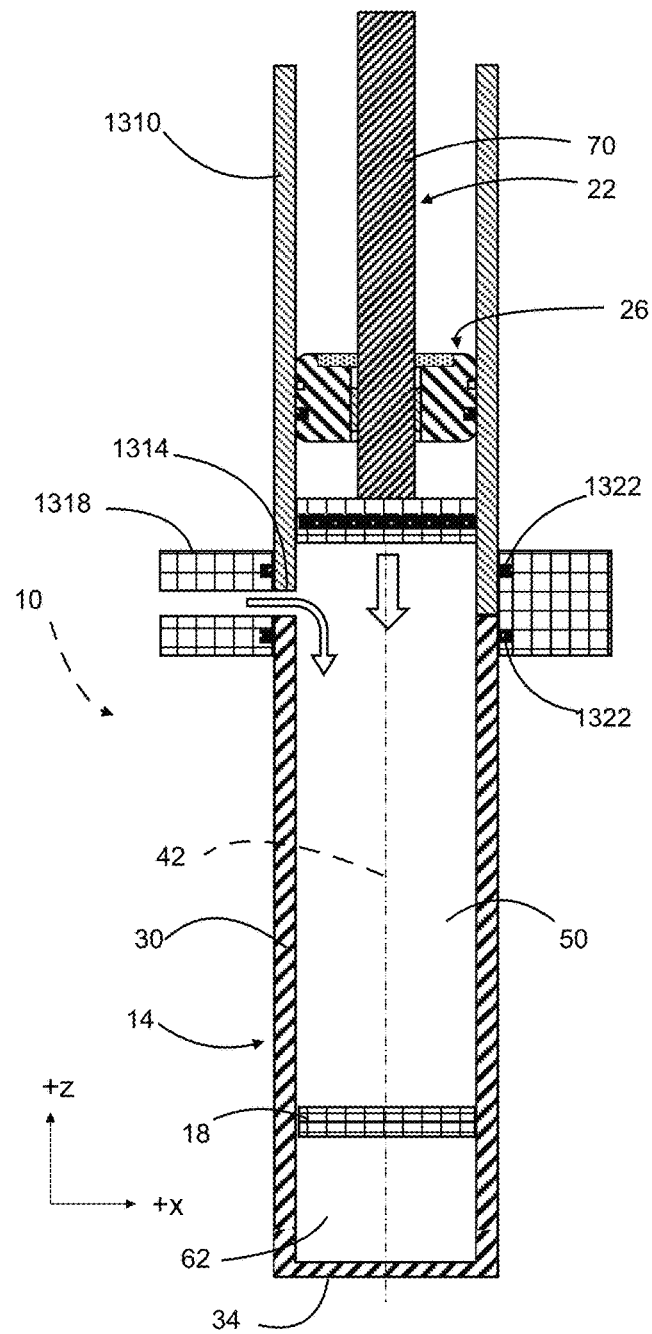

FIG. 5. is a cross-sectional view of a portion of the rod guide assembly of FIG. 2;

FIG. 6 is a cross-sectional view of a portion of a seal of the rod guide assembly of FIG. 2;

FIG. 7 is a cross-sectional view of a seat portion of a sintered metal rod guide of the rod guide assembly of FIG. 2;

FIG. 8 is a cross-sectional view of a monotube shock absorber similar to FIG. 1, illustrated in one step of a first assembly method in accordance with the teachings of the present disclosure;

FIG. 9 is a cross-sectional view of the monotube shock absorber of FIG. 8, illustrated in another step of the first assembly method;

FIG. 10 is a cross-sectional view of the monotube shock absorber of FIG. 8, illustrated in yet another step of the first assembly method;

FIG. 11 is a cross-sectional view of the monotube shock absorber of FIG. 8, illustrated in still another step of the first assembly method;

FIG. 12 is a cross-sectional view of a monotube shock absorber similar to FIG. 1, illustrated in one step of a second assembly method in accordance with the teachings of the present disclosure;

FIG. 13 is a cross-sectional view of the monotube shock absorber of FIG. 12, illustrated in another step of the second assembly method;

FIG. 14 is a cross-sectional view of the monotube shock absorber of FIG. 12, illustrated in yet another step of the second assembly method; and FIG. 15 is a cross-sectional view of the monotube shock absorber of FIG. 12, illustrated in still another step of the second assembly method.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIGS. 1 and 2, a shock absorber 10 is illustrated. The shock absorber 10 is a monotube type of shock absorber and includes a tube 14, a floating piston 18, a piston-rod assembly 22, and a rod guide assembly 26. The tube 14 includes a tube wall 30, an end wall 34, and a flange 38. The tube wall 30 is disposed about an axis 42. An internal surface 46 of the tube wall 30 defines a cylindrical internal cavity referred to herein as a cylinder 50. The end wall 34 is disposed at a bottom end portion 54 of the tube 14 and closes the bottom of the cylinder 50. The flange 38 is disposed at a top end portion 58 of the tube 14 and extends radially inward from the tube wall 30.

The floating piston 18 is disposed coaxially within the cylinder 50 and is in sealed, sliding contact with the internal surface 46 of the tube wall 30 such that the floating piston 18 may move axially within the cylinder 50. The floating piston 18 is disposed proximate to the bottom end portion 54 and cooperates with the bottom end portion 54 of the tube 14 to define a lower reservoir 62. In the example provided, the lower reservoir 62 is filled with a pressurized gas (e.g., air or nitrogen). Accordingly, the lower reservoir 62 is also referred to herein as the gas reservoir 62.

The piston-rod assembly 22 includes a piston 66 and a rod 70. The piston 66 is disposed coaxially within the cylinder 50 and configured to move axially therein. In the example provided, the piston 66 is in sliding contact with the internal surface 46 of the tube 14. The piston 66 can include one or more valves (not shown) to permit fluid to pass through the piston 66 in a controlled manner based on the velocity of the piston 66. The rod 70 is disposed coaxially with the piston 66 and is coupled thereto for axial movement with the piston 66. The rod 70 extends through the flange 38 of the tube 14.

The rod guide assembly 26 includes a rod guide 74 and a seal 78. In the example provided, the rod guide assembly 26 also includes a wet bearing 82 and an O-ring 86. The rod guide assembly 26, the tube wall 30 and the floating piston 18 cooperate to define an upper reservoir 90 within the cylinder 50. The upper reservoir 90 is also referred to herein as the oil reservoir 90.

The rod guide 74 is formed of sintered metal and is also referred to herein as the sintered metal rod guide. In other words, the rod guide 74 is formed into a single piece by sintering of metallic powder, though other additives may be included. In the example provided, the rod guide 74 is an iron-copper or copper steel material sintered according to international standard MPiF-35 with material FC-0205 or FC-0208, though other configurations can be used. As a result of the sintering process, the rod guide 74 is structurally and metallurgically different than a rod guide formed by forging, casting, or machining from solid metal. For example, the rod guide 74 is porous relative to a non-sintered solid metal. As a result, oil may seep into and through portions of the rod guide 74 itself.

Figure 4:
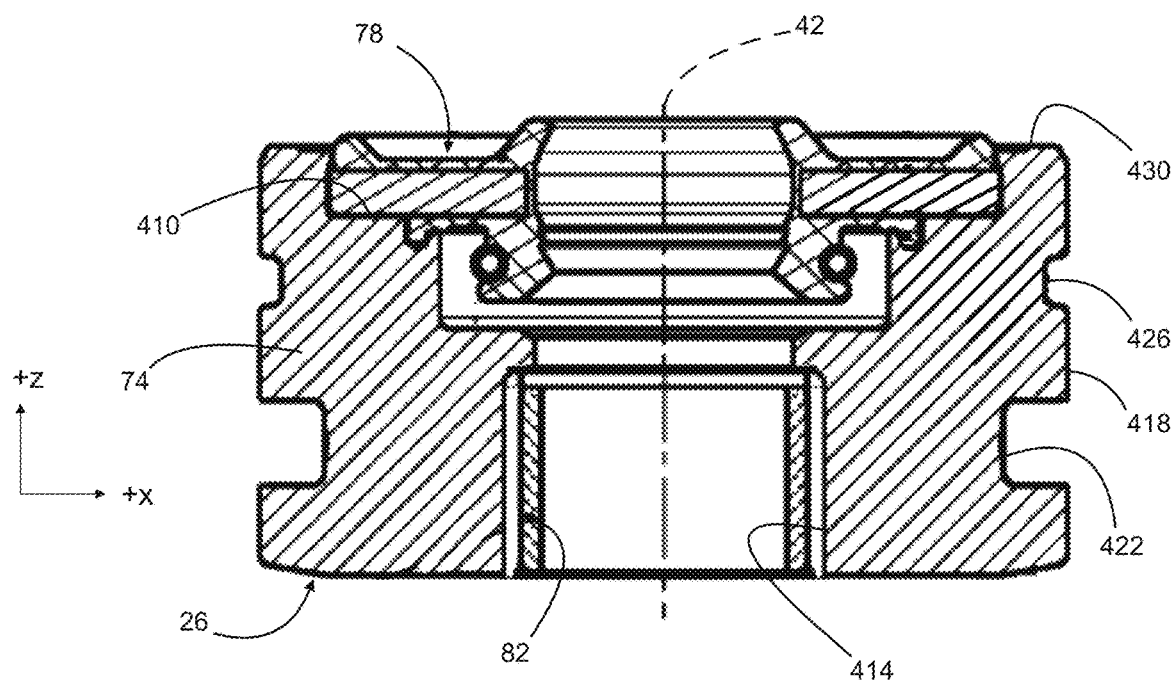
FIG. 4 is a cross-sectional view of the rod guide assembly of FIG. 2, taken along line 4-4 shown in FIG. 3.

Referring to FIG. 4, the rod guide 74 defines a seat 410 and a central bore 414. In the example provided, an outer surface 418 of the rod guide 74 includes an O-ring groove 422 and a crimp groove 426 that extend about a circumference of the rod guide 74. The O-ring 86 (FIG. 2) is disposed within the O-ring groove 422 and configured to form a seal between the rod guide 74 and the internal surface 46 of the tube 14. Referring to FIGS. 1, 2, and 4, the tube wall 30 is deformed (e.g., crimped) to intrude into the crimp groove 426 to inhibit axial movement of the rod guide 74 relative to the tube 14. In the example provided, the tube wall 30 is crimped at distinct locations about the circumference of the tube 14, though other configurations can be used.

Referring to FIGS. 5 and 7, the seat 410 is recessed from a top end 430 of the rod guide 74. The seat 410 includes a seat surface 434 and an anti-leak groove 438 recessed in the seat surface 434 and disposed about the axis 42. In the example provided, the density, and thus the ductility, of the rod guide 74 is not uniform throughout the entire rod guide 74. Instead, a first region 442 including the seat 410 has a density that is greater than a second region 446 that includes at least a portion of the top end 430 of the rod guide 74. In the example provided, the first region 442 has a density greater than or equal to 6.7 g/cm$^3$ and less than or equal to 7.1 g/cm$^3$ and the second region 446 has a density that is greater than or equal to 6.6 g/cm$^3$ and less than or equal to 7.0 g/cm$^3$, though other configurations can be used. In other words, the second region 446 has a greater ductility than the first region 442. In the example provided, the density gradient within the rod guide does not exceed 0.2 g/cm$^3$, though other configurations can be used.

Referring to FIG. 5, the seal 78 includes a washer 510 and a unitarily formed one-piece seal body 514 that includes a static seal portion 518, a dynamic seal portion 522 and a dust lip portion 526. The seal 78 is inserted into the seat 410 via the top end 430 of the rod guide 74. In the example provided, the seal body 514 is a rubber material, though other resilient materials may be used. The washer 510 is a rigid annular shape disposed about the axis 42 (shown in FIG. 4) and positioned in the seat 410. In the example provided, the washer 510 contacts the seat surface 434 and is metal, though other materials may be used. The static seal portion 518 includes an upper anti-leak lip 530 and a lower anti-leak lip 534 and defines a washer groove 538 axially between the upper and lower anti-leak lips 530, 534. The washer is disposed within the washer groove 538. In the example provided, the washer groove 538 is open radially outward and the static seal portion 518 is vulcanized to the washer 510 such that the static seal portion 518 forms a seal with the washer 510.

Referring to FIGS. 5-7, the lower anti-leak lip 534 extends downward from the washer 510 and is disposed about the axis 42 (shown in FIG. 4). The lower anti-leak lip 534 is positioned within the anti-leak groove 438 to form a seal therein. The relatively higher density of the rod guide 74 within the seat 410 can resist or inhibit seepage of oil around the lower anti-leak lip 534 and washer 510. The upper anti-leak lip 530 extends upward from the washer 510 and is disposed about the axis 42 (shown in FIG. 4). The upper anti-leak lip 530 can extend above the top end 430 of the rod guide 74 before the flange 38 is formed over the top end 430 of the rod guide 74. Thus, when the flange 38 is formed over the top end 430 of the rod guide 74, the upper anti-leak lip 530 forms a seal with the flange 38. The seal between the upper anti-leak lip 530 and the flange 38 can inhibit oil from escaping out the top of the tube 14 if it otherwise seeps through the sintered metal rod guide 74 or around the lower anti-leak lip 534 and washer 510 or around the O-ring 86.

Figure 3:
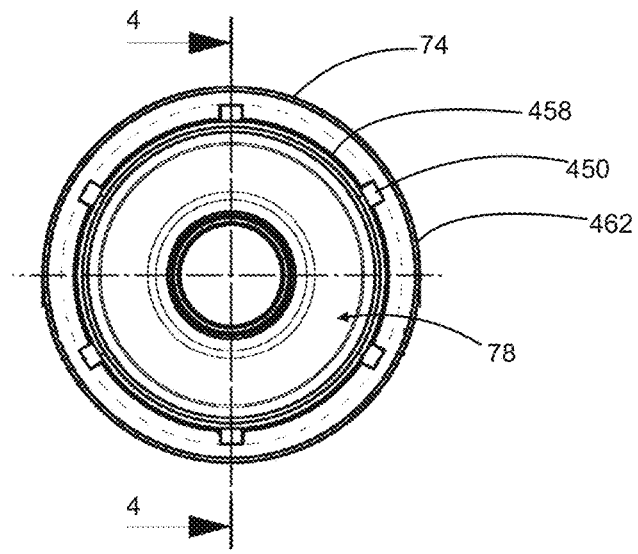
FIG. 3 is a top view of the rod guide assembly of FIG. 2.

Referring to FIGS. 3 and 5, the rod guide 74 is staked during a staking process, described in greater detail below, such that the stakes 910 (shown in FIGS. 9 and 14) are pressed into the top end 430 of the rod guide 74 and deform the top end 430 to define a plurality of stake indentations 450 and stake holds 454. The stake holds 454 are formed by the displacement of material from the stake indentations 450. The stake holds 454 extend radially inward to engage the upper anti-leak lip 530 and/or the washer 510 to secure the seal 78 in the seat 410. As best shown in FIG. 3, the stake indentations 450 are formed along an inner rim 458 of the top end 430 of the rod guide 74 and have a non-circular shape. In the example provided, the stake indentations 450 are generally rectangular and are equally spaced apart in the circumferential direction about the axis, though other configurations can be used. The stake indentations 450 are located in the second region 446 such that the lower density therein permits the rod guide 74 to deform during the staking process without cracking. In the example provided, the top end 430 of the rod guide 74 near the outer rim 462 has a higher density than near the inner rim 458 while maintaining a density gradient less than or equal to about 0.2 g/cm$^3$ between the inner and outer rims 458, 462. The density near the outer rim 462 may be similar to the density of the first region 442. The higher density proximate the outer rim 462 reduces or inhibits oil seepage around the top end 430.

Returning to FIG. 5, the dynamic seal portion 522 extends from the static seal portion 518 downward into the bore 414 and below the seat 410. The dynamic seal portion 522 includes a dynamic seal lip 542 that forms a seal with the rod 70. In the example provided, the dynamic seal portion 522 defines a spring groove 546 and a garter spring 550 is received therein to bias the dynamic seal lip 542 radially inward. In the example provided, the lower anti-leak lip 534 is axially between the dynamic seal lip 542 and the washer 510.

The dust lip portion 526 extends from the static seal portion 518 upward and can extend above the top end 430 of the rod guide 74. The dust lip portion 526 includes a dust lip 554 that contacts the rod 70 to inhibit dust and debris from entering the tube 14. In the example provided, the resiliency of the dust lip portion 526 maintains contact between the dust lip portion 526 and the rod 70. In an alternative configuration, not specifically shown, the dust lip portion 526 may also include a spring groove and a garter spring in the spring groove that can bias the dust lip portion 526 radially inward to maintain contact with the rod 70.

Returning to FIG. 4, the wet bearing 82 is seated within the bore 414 of the rod guide 74 below the seal 78. The wet bearing 82 engages the rod 70 to maintain the rod 70 coaxial with the axis 42 while the rod 70 moves along the axis 42.

Referring to FIGS. 8-11, steps in a first method of assembling the shock absorber 10 are shown and described herein, though additional or intermediate steps may be included. Referring to FIG. 8, the tube 14 is provided. At this step, the tube 14 includes the tube wall 30 and the end wall 34. The bottom end portion 54 of the tube 14 defines an opening or port 810 such as in the end wall 34. At this step, the flange 38 (FIG. 11) has not yet been formed from the tube wall 30 and the top end portion 58 of the tube 14 is open. The floating piston 18 is inserted into the cylinder 50 through the top of the tube 14.

Referring to FIG. 9, the piston-rod assembly 22 is then inserted into the cylinder 50 above the floating piston 18. After the floating piston 18 is inserted, oil is disposed into (e.g., poured or pumped into) the cylinder 50 above the floating piston 18. The oil may be disposed therein prior to, during, or after the piston-rod assembly 22 is inserted. Subsequently, the rod guide assembly 26 is inserted into the tube 14 about the rod 70. A crimp tool 914 then deforms (e.g., crimps) the tube wall 30 into the crimp groove 426. Stakes 910 are then pressed into the rod guide 74 to form the stake indentations 450 (FIGS. 3 and 5) and stake holds 454 (FIG. 5). In an alternative configuration, the rod guide 74 can be staked prior to being inserted into the tube 14.

Referring to FIG. 10, the gas reservoir 62 is pressurized. In the example provided, the pressurization may be a pressure test in which the gas reservoir 62 is filled with a pressurized gas and the shock absorber 10 is monitored for any leaks or abnormal behavior. The test pressure may be equal to or different from the final assembly pressure. The test gas may be the same or different from the gas used in the final assembly. In the example provided, if the shock absorber 10 passes the pressure test, then the port 810 is either sealed (i.e., if the test gas and pressure is the same as desired for the final assembly) or the gas reservoir 62 is filled with the desired gas and pressure for the final assembly and then the port 810 is sealed. The port 810 may be sealed by any suitable method such as welding for example. In an alternative configuration, a distinct step of pressure testing may not occur such that the gas reservoir 62 is pressurized directly with the desired gas and pressure and then the port 810 is sealed.

Referring to FIG. 11, after the gas reservoir 62 is pressurized and the port 810 is sealed, the flange 38 is formed. In the example provided, the flange 38 is formed by deforming (e.g., rolling) the top of the tube wall 30 over the top end 430 of the rod guide 74 so that the flange 38 seals on the upper anti-leak lip 530.

Referring to FIGS. 12-15, steps in a second method of assembling the shock absorber 10 are shown and described herein, though additional or intermediate steps may be included. Referring to FIG. 12, the tube 14 is provided. At this step, the tube includes the tube wall 30 and the end wall 34. Unlike the method of FIGS. 8-11, the bottom end portion 54 of the tube 14 does not include the port 810. Instead, the desired gas is disposed into the cylinder 50 via the top of the tube 14. The floating piston 18 is then inserted into the cylinder 50 and moved downward to trap the gas within the gas reservoir 62. The gas in the gas reservoir 62 may be pressurized by pressing the floating piston 18 downward in the cylinder 50.

Referring to FIG. 13, an assembly tube 1310 is positioned over the open top of the tube 14. In the example provided, the assembly tube 1310 has an inner diameter similar to that of the cylinder 50 and is coaxial with the axis 42. The assembly tube 1310 includes a fill port 1314. In the example provided, a filling device 1318 is positioned about the junction of the tube 14 and the assembly tube 1310. Oil is then disposed (e.g., poured or pumped) through the port 1314 and into the cylinder 50 above the floating piston 18 via the filling device 1318. The filling device 1318 can include seals 1322 that seal the filling device to the tube 14 and the assembly tube 1310 to inhibit oil from exiting the cylinder 50. Pumping the oil in can exert a downward force on the floating piston 18 to pressurize the gas in the gas reservoir 62.

The piston-rod assembly 22 and the rod guide assembly 26 are disposed within the assembly tube 1310 and then moved downward from the assembly tube 1310 into the cylinder 50 to seal the pressurized oil in the cylinder 50. In the example provided, the rod guide assembly 26 is disposed about the rod 70 before inserting the piston-rod assembly 22 into the cylinder 50.

Referring to FIG. 14, the crimp tool 914 then deforms (e.g., crimps) the tube wall 30 into the crimp groove 426. The crimping process may occur with the assembly tube 1310 still in place, though other configurations may be used. The stakes 910 are then pressed into the rod guide 74 to form the stake indentations 450 (FIGS. 3 and 5) and stake holds 454 (FIG. 5). In an alternative configuration, the rod guide 74 can be staked prior to being inserted into the tube 14.

Referring to FIG. 15, the shock absorber 10 may optionally then be tested before the flange 38 is formed. In the example provided, the damping of the shock absorber 10 is tested by moving the piston-rod assembly 22 axially.

With continued reference to FIG. 15, after the crimping process, the flange 38 is formed. In the example provided, the flange 38 is formed by deforming (e.g., rolling) the top of the tube wall 30 over the top end 430 of the rod guide 74 so that the flange 38 seals on the upper anti-leak lip 530 (FIG. 5).

When an element or layer is referred to as being "on," "engaged to," "connected to" or "coupled to," another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of manufacturing a shock absorber, the method comprising:
   inserting a floating piston into a tube;
   disposing oil into the tube;
   inserting a piston-rod assembly having a piston coupled to a rod into the tube;
   inserting a rod guide assembly into the tube, wherein the rod guide assembly comprises a sintered metal rod guide having a seat and a seal disposed in the seat, wherein the rod extends through the seal;
   staking the sintered metal rod guide, wherein the staking deforms a top end of the sintered metal rod guide to form a plurality of stake holds that engage the seal to secure the seal to the sintered metal rod guide;
   deforming a wall of the tube into engagement with the sintered metal rod guide to provide a piston-cylinder assembly and inhibit axial movement of the rod guide assembly relative to the tube;
   pressurizing the piston-cylinder assembly; and
   forming a flange portion of the tube over an upper surface of the sintered metal rod guide such that the flange portion is in sealing contact with the seal.

2. The method according to claim 1, wherein the step of staking the sintered metal rod guide is performed before inserting the rod guide assembly into the tube.

3. The method according to claim 1, wherein the tube comprises a bottom end portion having an opening and the step of pressurizing the piston-cylinder assembly comprises applying pressure through the opening in the bottom end portion of the tube.

4. The method according to claim 3 further comprising closing the opening in the bottom end of the tube to form a pressurized gas reservoir defined by the floating piston and the tube.

5. The method according to claim 1, wherein the step of staking the sintered metal rod guide is performed after deforming the wall of the tube into engagement with the sintered metal rod guide, wherein deforming the wall of the tube into engagement with the sintered metal rod guide includes deforming the wall of the tube into a recess defined by the sintered metal rod guide.

6. The method according to claim 1, wherein the step of forming the flange portion of the tube over an upper surface of the sintered metal rod guide is performed after pressurizing the piston-cylinder assembly.

7. The method according to claim 1 further comprising sintering metal to form the sintered metal rod guide, wherein the sintered metal rod guide has a first region that has a first density and a second region that has a second density that is less than the first density, wherein the seat is in the first region and the staking is performed on the second region.

8. The method according to claim 1, wherein the tube comprises a closed bottom end portion and the method further comprises moving the floating piston within the tube toward the bottom end portion of the tube to form a pressurized gas reservoir below the floating piston.

9. The method according to claim 1, wherein the step of forming the flange portion of the tube over the upper surface of the sintered metal rod guide includes rolling the flange portion over the upper surface of the sintered metal rod guide so that the flange portion contacts the seal.

10. The method according to claim 1, wherein the tube and the floating piston define a gas reservoir, wherein pressurizing the piston-cylinder assembly includes:
    raising a pressure within the gas reservoir to a test pressure; and
    monitoring the shock absorber for leaks while at the test pressure,
    wherein raising the pressure within the gas reservoir to the test pressure and monitoring the shock absorber for leaks while at the test pressure are performed before forming the flange portion of the tube over the upper surface of the sintered metal rod guide.

11. The method according to claim 1, further comprising testing a damping of the shock absorber before forming the flange portion.

12. The method according to claim 1, wherein the seal includes a washer and a resilient seal body that forms a seal between the flange portion and the washer after forming the flange portion of the tube over the upper surface of the sintered metal rod guide, wherein the stake holds extend radially inward of an outer perimeter of the washer to inhibit axial movement of the seal.

13. A method for assembling a shock absorber, the method comprising:
    inserting a floating piston into a tube;
    disposing oil into the tube on top of the floating piston;

inserting a piston-rod assembly having a piston and a rod into the tube to form an oil reservoir between the floating piston and the piston of the piston-rod assembly;

inserting a rod guide assembly into the tube, the rod guide assembly comprising a sintered metal rod guide and a seal, wherein the rod extends through the seal and is in sealing contact with the seal, wherein the sintered metal rod guide includes a seat surface and a groove, the seat surface being recessed from a top end of the sintered metal rod guide, the groove being recessed in the seat surface, wherein the seal includes a resilient body that defines a static seal portion and a dynamic seal portion, wherein the seal contacts the seat surface and a lower lip of the static seal portion is received in the groove to form a seal therein with the sintered metal rod guide, wherein the dynamic seal portion contacts the rod;

crimping a wall of the tube into engagement with the sintered metal rod guide to form a piston-cylinder assembly to inhibit axial movement of the sintered metal rod guide relative to the tube;

pressurizing the piston-cylinder assembly; and rolling a flange portion of the tube over an upper surface of the sintered metal rod guide such that the flange portion is in sealing contact with the seal, wherein rolling the flange portion of the tube occurs after pressurizing the piston-cylinder assembly.

14. The method according to claim 13, wherein the step of pressurizing the piston-cylinder assembly comprises applying pressure through a bottom end portion of the tube.

15. The method according to claim 13 further comprising staking the sintered metal rod guide to secure the seal to the sintered metal rod guide.

16. The method according to claim 15, wherein the step of staking the sintered metal rod guide is performed before pressurizing the piston-cylinder assembly.

17. The method according to claim 13, wherein the static seal portion includes an upper lip in sealing contact with the flange portion after rolling the flange portion of the tube over the upper surface of the sintered metal rod guide.

18. A method of manufacturing a shock absorber, the method comprising:

inserting a floating piston into a tube;

disposing oil into the tube;

inserting a piston-rod assembly having a piston coupled to a rod into the tube;

inserting a rod guide assembly into the tube, wherein the rod guide assembly comprises a sintered metal rod guide having a seat and a seal disposed in the seat, the sintered metal rod guide having a first region that has a first density and a second region that has a second density that is less than the first density, wherein the seat is in the first region and the rod extends through the seal;

deforming a wall of the tube into engagement with the sintered metal rod guide to provide a piston-cylinder assembly and inhibit axial movement of the rod guide assembly relative to the tube;

staking the sintered metal rod guide to secure the seal to the sintered metal rod guide, wherein the staking is performed on the second region;

pressurizing the piston-cylinder assembly; and forming a flange portion of the tube over an upper surface of the sintered metal rod guide.

19. The method according to claim 18, wherein the step of pressurizing the piston-cylinder assembly comprises applying pressure through a top end of the tube.

20. The method according to claim 18, wherein the sintered metal rod guide comprises a groove and the seal comprises a static seal portion and a dynamic seal portion, the static seal portion including a lower lip disposed in the groove and an upper portion in contact with the flange.

* * * * *